Feb. 16, 1926. 1,573,671
L. BLACKMORE ET AL
WHEEL ASSEMBLY
Filed Jan. 9, 1922
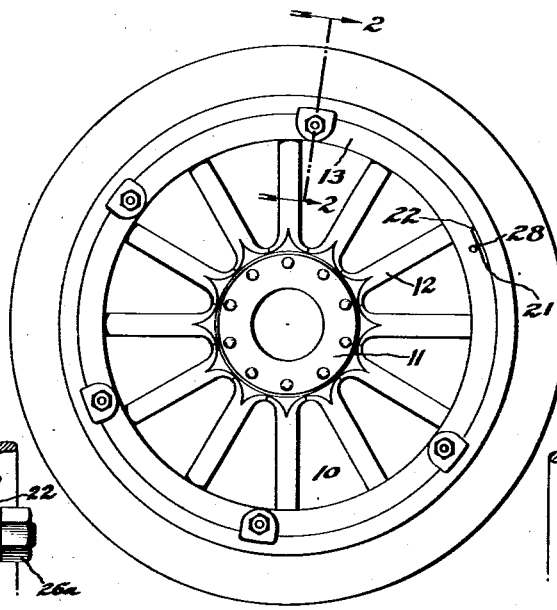
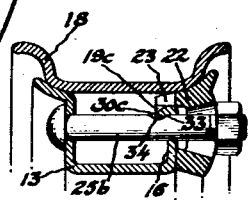
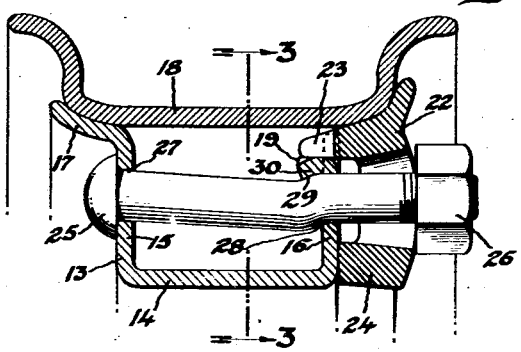
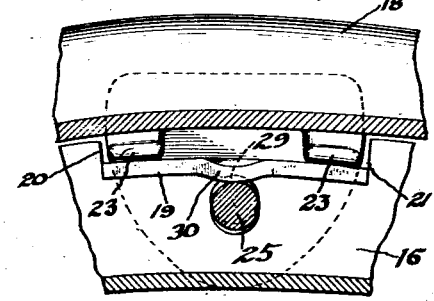
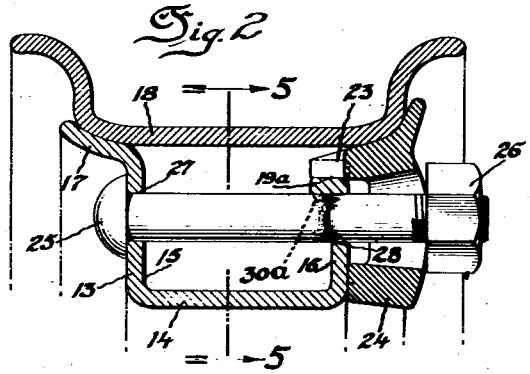
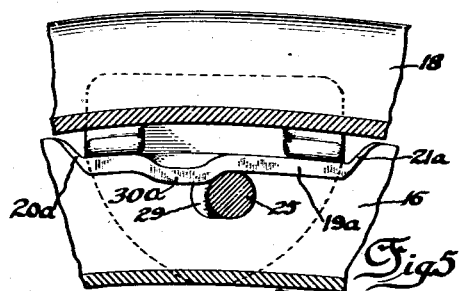

Patented Feb. 16, 1926.

1,573,671

UNITED STATES PATENT OFFICE.

LLOYD BLACKMORE AND LOUIS M. SPENCER, OF HIGHLAND PARK, MICHIGAN, ASSIGNORS TO GENERAL MOTORS CORPORATION, OF DETROIT, MICHIGAN, A CORPORATION OF DELAWARE.

WHEEL ASSEMBLY.

Application filed January 9, 1922. Serial No. 527,879.

*To all whom it may concern:*

Be it known that we, LLOYD BLACKMORE and LOUIS M. SPENCER, citizens of the United States, and residents of Highland Park, county of Wayne, and State of Michigan, have invented certain new and useful Improvements in Wheel Assemblies, of which the following is a full, clear, concise, and exact description, such as will enable others skilled in the art to which the invention relates to make and use the same, reference being made therein to the accompanying drawings, which form a part of this specification.
This invention relates to wheels for automobiles and other vehicles.

One of the objects of the invention is the provision of new and improved means associated with a wheel felly for securing a demountable rim in position thereon, together with other new and improved cooperating features, whereby when the rim is in operative position on the wheel it is firmly held in such position during the travel of the vehicle.

Another object of the invention is the provision of a new and improved rim bolt that is cheap to manufacture; easily applied; that is durable and efficient in operation;
and one that when once properly attached to the felly will not accidentally become detached therefrom.

Other and further objects of the invention will appear as the description proceeds.
On the drawings:

Figure 1 is a side elevation of the wheel showing the invention applied thereto;

Figure 2 is a section on line 2—2 of Figure 1;
Figure 3 is a section on line 3—3 of Figure 2;

Figure 4 is a transverse section of a portion of a wheel showing a modified form or arrangement of the device;
Figure 5 is a vertical section on line 5—5 of Figure 4; and Figure 6 is a transverse section of a portion of a wheel showing a further modified form or arrangement of the device, and Figure 7 is a section of a still further modified form.

Formerly, fellies for automobile wheels were constructed of wood, but owing to the scarcity of the proper kind of wood required for this construction, it has become more and more necessary in recent years to substitute metal for wood in the construction of fellies as well as in the construction of other articles of various kinds. This is especially true of automobile parts that are subjected to severe strains for the reason that wood suitable for the purpose can hardly be obtained.

The felly, if made of metal, is usually channel shape in cross-section and the employment of a demountable rim on such a construction presents certain difficulties not present in the wooden fellies formerly employed. The flanges of the felly extend radially outwardly and for this reason specially constructed seats must be provided for the wedges and these seats must be so arranged that they will afford firm support for the wedges. Moreover, the wedge bolts in such a construction must be so made that they will not turn in the felly; will be prevented from becoming accidentally disengaged; and will not clamp the flanges toward each other when the nuts are applied.

An embodiment of an invention for accomplishing the above is clearly illustrated on the accompanying drawings in which the numeral 10 designates a wheel having the hub 11, spokes 12, and the felly 13 secured to the outer end of said spokes.

The felly 13 is of metal and consists of the base portion 14 and the radially outwardly extending flanges 15 and 16. The flange 15 has its peripheral edge 17 bent laterally and radially outwardly to form an incline or cone-shaped seat on which one edge of the rim 18 is adapted to engage. The flange 16 is provided at intervals with distorted portions to form supports or seats for the wedges. These distorted portions may be formed in any suitable manner. These distorted portion forming the flanges or wedge seats 19 may be formed by making parallel radial cuts 20 and 21 in the flange 16 and bending the portion 19 between the slots laterally as shown in Figures 2 and 3, or they may be formed by bending portions 19ª of the flange 16 inwardly without cutting or slotting the same, as is shown in Figures 4 and 5. This latter structure provides a wide bearing surface and a firm support for the wedge without appreciably weakening the felly. With this arrangement it is not necessary that the flange 19ª be reinforced by the rim or wedge bolt since the connecting portions 20ª and 21ª reinforce the seats 19 at each end thereof.

Rim wedges 22 are employed for securing the rim 18 in position on the felly. Each wedge consists of a nose portion 23 which is adapted to engage the seat 19 and a fulcrum or heel portion 24 which is adapted to fulcrum on the inner edge of the side flange 16 (see Figure 2). Bolts 25 having nuts 26 are provided for forcing the wedges 22 inwardly between the felly and rim for securing the latter in position thereon. These bolts are adapted to engage circular apertures 27 and 28 in the flanges 13 and 16, respectively. The aperture or opening 28 has its upper edge in alignment with the lower edge of the inturned flange or seat 19 in order to provide sufficient space on the flange for the engagement of the fulcrum 24 of the wedge, and in order that said flange or seat may rest on the bolt 25 and afford a firm support for the nose 23 of the wedge when the wedge is forced home between the rim and the felly. In other words, the bolt 25 will reinforce the flange 19 and prevent the same from springing radially inward when the wedges are applied.

Means are provided for preventing the bolt from turning; for preventing the clamping of the flanges together; and for preventing the accidental withdrawal of the bolt when the nuts 26 are removed therefrom. In order to accomplish this, each bolt 25 is provided with a suitable retaining shoulder. In the form of the device shown in Figure 2 the retaining shoulder is in the form of an off-set in the bolt which forms a shoulder 29 that is arranged vertically, i. e., the shoulder is arranged adjacent to the flange 19. The flange 19 has a portion 30 bent downwardly to engage the shoulder 29. In practice this is accomplished by hitting the portion 30 of the laterally extending flange 19 a hammer blow which bends a portion of the flange adjacent to said shoulder into engagement with the back side of said off-set or shoulder.

It will thus be seen that by this arrangement the bolt is not only prevented from turning but is also prevented from being withdrawn from the felly. In other words, the off-set portion of the bolt will engage the flange 19 and prevent the bolt from turning while the downwardly bent portion of the flange 30 will prevent withdrawal of the bolt. Moveover, the off-set portion will engage the inner side of the flange 16 to prevent clamping the flanges together when the nut 26 is applied.

In Figures 4 and 5 of the device, the bolt is shown as being off-set in a plane parallel with the flange or wedge seat 19ª. In this form of the device the portion 19ª of the flange 16 is formed by pressing the portion 19ª downwardly without cutting or partially severing it from the flange 16. Its free edge at 30ª is forced downwardly behind the shoulder 29 of the bolt 25 to prevent the withdrawal of the bolt. It will be noted that in both forms of the device the inturned flanges or seats for the wedges rest on the bolt 25 which constitutes a support for reinforcing them.

The arrangement shown in Figure 6 differs from that shown in Figures 2 and 3 in that the rim or wedge bolt 25ª is provided with an anugular portion or shoulder 31 adjacent to the head which is adapted to engage a corresponding angular aperture 27ª in the inner flange 13 to prevent the bolt from turning while the nut 26ª is being applied or removed. The outer end of the bolt is provided with an upset shoulder 32 which is adapted to engage the inner side of the flange 16 to prevent inward movement of the same when the nut 26ª is applied. The inner or free end of the flange 19 is bent to engage the rear side of the shoulder 32 to prevent accidental removal of the bolt, as in the other forms of the device.

In the form of the device illustrated in Figure 7 the bolt is shown as being straight and a retaining shoulder 33 is provided by forming a recess or depression 34 in the bolt 25ᵇ into which the portion 30ᶜ of the inturned flange 19ᶜ may be depressed for preventing the turning or removal of the bolt. In this form of bolt no provision is made for engaging the inner side of the flange 16, for preventing the flanges 15 and 16 from being clamped toward each other when the nut is applied to the wedge bolt but the portion 30ᶜ will in most cases engage the inner shoulder formed by the depression 33 and prevent the clamping of the two flanges 13 and 16 toward one another. However, this feature, while desirable in certain forms of channel, is not necessary in most fellies since the movement of the flanges 15 and 16 toward each other is so slight as to be almost if not entirely negligible.

It is thought from the foregoing taken in connection with the accompanying drawings that the construction and operation of our device will be apparent to those skilled in the art, and that various changes in size, shape, proportion and details of construction may be made without departing from the spirit and scope of the appended claims.

We claim:

1. In a wheel, a channel felly having laterally bent portions on one flange of said channel, a rim engaging the other flange thereof, rim wedge bolts extending through said flanges and engaging beneath said portions for reinforcing the same and having means for engaging said portions for preventing the withdrawal of said bolts, and wedges engaging said bolts and having members engaging between said portions and said rim.

2. In a wheel, a channel felly having its flanges extending outwardly and provided with apertures therethrough, one of said flanges having portions bent inwardly therefrom to form wedge seats, a rim wedge bolt extending through said apertures, said bolt provided with an off-set portion for engaging one of said wedge seats to prevent the rotation of said bolt substantially as shown and described.

3. In a device of the class described, a hollow felly, and a rim wedge bolt circular in cross-section and provided with an offset adjacent the threaded end thereof, which offset forms a shoulder engaging the inner surface of one side of the felly, substantially as shown and described.

4. In a wheel, a channel felly having laterally bent portions in one flange of said channel, rim wedge bolts extending through both flanges of said channel felly adjacent to said portions, and means on said bolts for engaging said portions to prevent withdrawal of said bolts from said felly.

5. In a wheel, a channel felly having its flanges etxending radially outwardly and provided with apertures therethrough, a wedge bolt extending through said apertures, said bolt provided with a distorted portion, one of said flanges being provided with wedge seats partially severed from said flange and having a portion engaging the distorted portion of said bolt to prevent the removal of said bolt from said felly.

6. In a wheel, a channel felly having its flanges etxending outwardly and provided with apertures, a wedge bolt extending through said apertures and provided with a shoulder for engaging the outer flange, and a wedge seat on one of said flanges having a distorted portion in engagement with said shoulder to prevent the withdrawal of said bolt.

7. In a wheel, a channel felly having its flanges extending outwardly and provided with apertures, a wedge bolt extending through said apertures and provided with a depression, one of said flanges having a portion engaging said depression substantially as shown and described.

In testimony whereof we affix our signatures.

LLOYD BLACKMORE.
LOUIS M. SPENCER.